United States Patent [19]

Thomas et al.

[11] Patent Number: 4,721,519

[45] Date of Patent: Jan. 26, 1988

[54] STABLE AMMONIUM POLYPHOSPHATE LIQUID FERTILIZER FROM MERCHANT GRADE PHOSPHORIC ACID

[75] Inventors: William P. Thomas, Winter Haven; William S. Lawton, Lakeland, both of Fla.

[73] Assignee: American Petro Mart, Inc., Bartow, Fla.

[21] Appl. No.: 841,873

[22] Filed: Mar. 20, 1986

[51] Int. Cl.$^4$ ................................................ C05B 7/00
[52] U.S. Cl. .......................................... 71/34; 71/43; 423/313; 423/321 R
[58] Field of Search .............................. 71/1, 34, 43; 423/321 R, 313

[56] References Cited

U.S. PATENT DOCUMENTS

| | | | |
|---|---|---|---|
| Re. 29,149 | 3/1977 | Young | 423/313 |
| 3,464,808 | 9/1969 | Kearns . | |
| 3,988,140 | 10/1976 | Burns et al. | 71/43 X |
| 4,363,880 | 12/1982 | Whitney et al. . | |
| 4,385,993 | 5/1983 | Hedrick et al. . | |
| 4,461,710 | 7/1984 | Erickson et al. . | |
| 4,493,907 | 1/1985 | Hedrick et al. . | |

OTHER PUBLICATIONS

CA 98(24): 200608q, Gafurov et al, 1983.
CA 88(8): 52552t, Melamed et al, 1976.
Frazier et al., J. Agr. Food Chem. (1966) 14:522–529.
Frazier et al., "Stabilizing Liquid Fertilizer with Fluorine Compounds" in Fertilizer Solutions, Issue Jul.–Aug. 1972.
Lehr, et al., J. Agr. Food Chem. (1966) 14:27–33.

*Primary Examiner*—Ferris H. Lander
*Attorney, Agent, or Firm*—Tilton, Fallon, Lungmus & Chestnut

[57] ABSTRACT

A stable ammonium polyphosphate liquid fertilizer is prepared from concentrated wet-process phosphoric acid of 54–62% $P_2O_5$, which prior to concentration is treated with a cation exchange resin to remove magnesium and calcium without appreciable reduction of iron and aluminum. The liquid fertilizer will remain substantially sludge-free when stored at 25° C. for six months without the addition of any sequestering or suspending agent.

13 Claims, No Drawings

STABLE AMMONIUM POLYPHOSPHATE LIQUID FERTILIZER FROM MERCHANT GRADE PHOSPHORIC ACID

FIELD OF INVENTION, BACKGROUND, AND PRIOR ART

The field of the invention is liquid fertilizers produced from concentrated wet-process phosphoric acid. The invention is particularly concerned with the production of sludge-free liquid fertilizers from merchant grade phosphoric acid.

Merchant phosphoric acid is produced from phosphoric acid by the so-called "wet process" in which phosphate rock is digested with sulfuric acid. The initial phosphoric acid product may contain from 23 to 33% P2O5. The crude phosphoric acid, after filtration, is concentrated by evaporation of water to obtain commercial grade phosphoric acid. The merchant grade acid usually contains around 54% P2O5, while the superphosphoric acid contains about 70% P2O5.

Concentrated phosphoric acids, such as merchant or superphosphoric, can be reacted with ammonia to produce ammonium polyphosphate reaction products, which may be used in liquid or solid fertilizers. A commercial conversion process is described in U.S. Pat. No. 3,464,808. A related process has been developed by the Tennessee Valley Authority. See Melin, et al., *Farm Chemicals*, 133 (11): 26–36 (1970).

There has been a long-recognized and heretofore not adequately solved problem of how to produce stable liquid fertilizers from concentrated wet process phosphoric acids. Phosphate rock contains metal impurities which are solubilized curing the digestion of rock and are present in the crude acid. Such impurities include iron, aluminum, magnesium, calcium, sodium, and potassium.

Heretofore the iron and aluminum impurities have been particularly troublesome. Frazier et al. (1966) cited below point out that iron and aluminum salts are quite soluble in merchant grade acid. However, upon ammoniation the solubility of $Fe^{+3}$ and $Al^{+3}$ decreases rapidly. Resulting precipitates of iron and aluminum compounds create a handling problem and also immobilize phosphorus in forms not readily available to crops. When ammoniation is to the usual neutral pH range of 5 to 7, gelatinous iron/aluminum precipitates can form. Such precipitation, often referred to as "sludging," can continue during storage of the liquid fertilizer. Shelf life for ammonium polyphosphate liquid fertilizer in excess of six months is desired by the fertilizer industry, but has not heretofore been satisfactorily obtained with liquid fertilizer prepared from merchant grade acid.

With the mining and use of phosphate rock containing increased amounts of magnesium, it has become desirable to remove magnesium from the crude phosphoric acid. Ion exchange treatment can be employed for Mg removal, as described in U.S. Pat. Nos. 4,385,993, 4,363,880, and 4,493,907. While cation exchange resins are effective for removing magnesium and calcium, such treatment results in very little reduction in trivalent aluminum ($Al^{+3}$) and ferric iron ($Fe^{+3}$). Divalent iron ($Fe^{+2}$) can be removed but in phosphate rock most of the iron is present in trivalent form. Cation exchange also achieves some reduction of monovalent metals (e.g., $Na^+$ and $K^+$).

Concentration of wet process phosphoric acid by evaporation of water beyond 60–62% P2O5, depending upon the impurity content, converts the orthophosphates to polyphosphates. Increased concentration produces additional polyphosphates. This is desirable since pyrophosphate and other polyphosphates are capable of sequestering metal ions, and thereby can contribute to the stability of the concentrated acid and to liquid fertilizers prepared therefrom. Heretofore, however, it has not been possible to produce ammonium polyphosphate liquid fertilizers directly from merchant acid which remains stable and sludge-free on prolonged storage. The following references recognize this problem: U.S. Pat. No. 3,988,114; Frazier, et al., *J. Arg. Food Chem.* (1966), 14: 522–529; and Frazier, et al., "Stabilizing Liquid Fertilizer with Fluorine Compounds," in *Fertilizer Solutions*, Issue July–August 1972.

The industry's answer to the above problem has been to utilize superphosphoric acid for the production of ammonium polyphosphate liquid fertilizers. The increased sequestering capacity of the higher polyphosphates present in the superphosphoric acid can provide improved stability. However, with extended holding of the liquid fertilizers, sludging problems are still encountered. This has led to proposals for the addition of stabilizing compounds to promote sequestration and/or suspension of the metal compounds. See, for example, Frazier et al. (1972), cited above, and U.S. Pat. No. 3,988,140.

It has also been proposed to reduce the concentrations of iron and aluminum compounds by blending merchant and/or superphosphoric acids with wet process phosphoric acid which has been subjected to solvent extraction to remove metal ions. Such a procedure is described in the U.S. Pat. No. 3,988,140. Similarly, furnace process phosphoric acid, which is very low in metal ions, can be blended with wet-process phosphoric acid to reduce metal ion concentrations. These procedures, however, add substantially to the cost of phosphoric acid as a raw material for producing liquid fertilizers.

The foregoing problems have led to intensive study of the complex precipitated impurities for wet-process phosphoric acid. See, for example, Lehr, et al., *J. Agr. Food Chem.* (1966) 14: 27–33. The search has continued for a practical, low-cost process for producing sludge-free liquid ammonium polyphosphate fertilizers from merchant phosphoric acid.

SUMMARY OF THE INVENTION

Cation exchange treatment of wet-process phosphoric acid was originally proposed for reduction of magnesium in acid prepared from phosphate rock containing relatively high concentrations of magnesium. A folded moving bed ion exchange system which can be used for this purpose is described in U.S. Pat. No. 4,381,993. Reduction of magnesium together with calcium by cation exchange treatment improves the stability of the phosphoric acid. This benefit is obtained even though cation exchange treatment does not appreciably reduce the iron and aluminum content. Iron and aluminum compounds are quite soluble in phosphoric acid. However, the solubility of iron and aluminum compounds in liquid ammonium polyphosphate fertilizers is much less than in merchant phosphoric acid. Frazier, et al., "Stability Liquid Fertilizers with Fluorine Compounds," in *Fertilizer Solutions*, Issue July–August 1977.

Studies of commercial uses for cation exchange treated wet-process phosphoric acid did not propose preparation of merchant grade phosphoric acid for conversion into ammonium polyphosphate liquid fertilizers. This was not an expected use. It was assumed that liquid fertilizers prepared from merchant grade phosphoric acid of cation exchange treated acid would not be stable. Sludging was expected because of the presence of the iron and aluminum remaining on the acid.

It was surprising to discover that cation exchange treated phosphoric acids at merchant acid grade concentrations can produce highly stable liquid fertilizers. Stability is achieved even though the liquid fertilizer contains as little as 40% of the P2O5 as polyphosphate, primarily in the form of pyrophosphate. The explanation is not known with certainty, but apparently the distribution of metal ions in cation exchange treated phosphoric acid is favorable to stability of liquid fertilizers. The metal ion content is high in ferric iron and aluminum and low in magnesium, calcium, sodium and potassium. After removal of magnesium, calcium, sodium and potassium, the presence of iron and aluminum appears to have little effect on stability of liquid fertilizer. This unusual balance of metal ions is not known to have been achieved in prior art procedures. The blending of solvent-extracted acid or furnace acid with wet-process acid reduced the content of all metal ions and did not provide a new distribution in which the trivalent ion content remained unchanged.

By the method of this invention, ammonium polyphosphate liquid fertilizer can be prepared from concentrated wet-process phosphoric acid having P2O5 concentrations of 54-62%. The resulting liquid fertilizers can remain sludge-free when stored without addition of sequestering or suspending agents. This invention permits commercially important liquid fertilizers (e.g., 10-34-0 or 11-37-0 fertilizers) to be prepared in a stable sludge-free form from merchant acid.

DETAILED DESCRIPTION

Phosphoric acid for use in preparing the liquid fertilizers of this invention can be obtained by conventional wet-process digestion of phosphate rock. Relatively high concentrations of iron, aluminum, and magnesium in the rock can be accepted.

The phosphate rock is digested with sulfuric acid according to standard procedures, and crude phosphoric acid is obtained from 23 to 33% P2O5. Commonly the P2O5 contents will be from about 24 to 27%. The crude phosphoric acid will contain metal ions in substantially the same proportions as the phosphate rock.

The crude acid is filtered and subjected to cation exchange treatment. The cation exchange resin is used in the hydrogen form. The resin is preferably a sulfonated polystyrene cation exchange resin. Such resins are available commercially. The cation exchange treatment may be carried out by passing the aqueous phosphoric acid through stationary beds of the resin. However, it is preferred to utilize a moving bed ion exchange system as described in U.S. Pat. No. 4,386,993. In this system, regenerated increments of resin are introduced into the bottom of a loading column and moved upwardly therein in a series of pulses. The crude phosphoric acid is introduced into the top of a column and passed downwardly through the cation exchange resin increments. Loaded resin is removed from the top of the column and phosphoric acid of reduced metal ion content is discharged from the bottom of the column. The resin is loaded by metallic cations. Precise metering of the increments of ion exchange resin can be obtained by using the apparatus described in U.S. Pat. No. 4,461,710.

The increments of resin after removal from the top of the loading column are regenerated by treatment with sulfuric acid. The calcium may first be removed as described in U.S. Pat. No. 4,363,880. Thereafter, the resin increments may be passed to a moving bed column for removal of the magnesium using high concentration sulfuric acid, as described in U.S. Pat. No. 4,493,907.

The cation exchange treated phosphoric acid is concentrated by evaporation of water. Conventional evaporation equipment can be used. A desirable concentration range for the purpose of the present invention is from 54 to 62 weight percent P2O5, and preferred concentration is from 56 to 60% P2O5. The concentrated acid corresponds to standard merchant grade acid.

On a weight percent basis the concentrated acid will contain at least 1.0% total iron and aluminum, calculated as Fe2O3 and Al2O3 and referenced to 60% P2O5. It will contain less than 0.3% magnesium claculated as MgO, and less than 0.15% total of sodium, potassium, and calcium, calculated respectively as Na2O, K2O and CaO. A typical analysis of the iron, aluminum, magnesium, calcium, sodium and potassium content of the concentrated acid (60% P2O5) is set out below.

| Calculated As | Weight % |
| --- | --- |
| Fe2O3 | 0.5 to 2.5 |
| Al2O3 | 1 to 2.5 |
| MgO | Below 0.3 |
| CaO | Below 0.04 |
| Na2O | Below 0.05 |
| K2O | Below 0.03 |

As indicated by the foregoing table, the combined concentration of iron and aluminum combined, calculated as Fe2O3 and Al2O3, will typically exceed 1.5 wt.%.

Concentrated acid of the metal ion distribution described above is employed to prepare the ammonium polyphosphate fertilizer by standard procedures. The phosphoric acid concentrate is reacted with anhydrous ammonia in proportions to produce the desired fertilizer product. One preferred product is 10-34-0 fertilizer which contains 10% nitrogen (N) and 34% P2O5 (weight basis). An 11-37-0 fertilizer may also be prepared. For preparing a 10-34-0 product, a molar ratio of 1.45 to 1.55 moles of NH3 per mole of PO4 can be used. The reaction may be carried out in a T-reactor. Such a processing procedure is described in detail in U.S. Pat. No. 3,464,808.

The reaction is highly exothermic, and the reacted ammonium polyphosphate is produced as a melt. It is common practice to quench the melt in water immediately. The resulting aqueous solution may comprise the liquid fertilizer of the desired nitrogen and P2O5 content. Precise ratios of nitrogen and P2O5 may be adjusted in the liquid product. The liquid fertilizers will have from 35 to 65% of the phosphate therein in polyphosphate form. In preferred embodiments of this invention, liquid fertilizers will have from 40-55% of the phosphate therein in polyphosphate form.

The resulting liquid fertilizer thus obtained will contain the metal ions in the same relative proportions as the concentrated phosphoric acid starting material. However, the iron the aluminum are effectively sequestered and prevented from forming precipitates even on prolonged holding of the liquid fertilizer. Holding tests have shown that the liquid fertilizers remain sludge-free when stored for prolonged periods of time over a wide range of temperatures. As a convenient standard, it can be specified that the liquid fertilizers of this invention are characterized by remaining sludge-free when stored at 25° C., for six months. This standard assumes that liquid fertilizer is stored as produced, and that no sequestering or suspending agent is added. This six months storage standard is not a limitation on liquid fertilizer stability. Liquid fertilizers produced in accordance with this invention, such as 10-34-0 and 11-37-0 fertilizers, can be expected to remain substantially sludge-free for much longer storage times.

The method of this invention and the resulting liquid fertilizer products produced thereby are further illustrated by the following examples:

EXAMPLE I

A typical wet-process phosphoric acid was treated by the ion exchange method as described in U.S. Pat. No. 4,385,993 using a macroporous polystyrene based sulfonated cation exchange resin. The composition of the untreated and treated phosphoric acids are shown in Table I.

TABLE I

| Sample I.D. | Untreated Acid | Treated Acid |
|---|---|---|
| Analysis, wt % | | |
| Total $P_2O_5$ | 26.0 | 24.0 |
| $SO_4$ | 1.74 | 2.10 |
| MgO | 0.49 | 0.14 |
| $Na_2O$ | 0.067 | 0.033 |
| $K_2O$ | 0.037 | 0.013 |
| CaO | 0.11 | 0.01 |
| $Fe_2O_3$ | 1.05 | 1.06 |
| $Al_2O_3$ | 0.84 | 0.71 |
| $SiO_2$ | 0.80 | 0.59 |

The sample of treated acid was then concentrated in a continous feed pilot plant vacuum evaporator to a "merchant grade" phosphoric acid, in this case, 55.5% $P_2O_5$. During evaporation the absolute pressure and temperature were maintained at 1.5 to 2 inches mercury and 175° C. to 180° F., respectively. The composition of the evaporated acid resulting from evaporation and used as the feed stock in the following liquid fertilizer test is shown in Table 2.

TABLE 2

| Sample I.D. | Concentrated Acid |
|---|---|
| Analysis, wt % | |
| Total $P_2O_5$ | 55.5 |
| Ortho $P_2O_5$ | 52.4 |
| $SO_4$ | 5.69 |
| MgO | 0.16 |
| $Na_2O$ | 0.038 |
| $K_2O$ | 0.012 |
| CaO | 0.02 |
| $Fe_2O_3$ | 2.40 |
| $Al_2O_3$ | 1.80 |
| $SiO_2$ | 1.78 |

Ammoniation of the concentrated phosphoric acid was carried out in a conventional pipe reactor. The liquid fertilizer was produced by a semi-batch method in which a calculated amount of water was added to a stirred product tank before starting the feed to the pipe reactor. The phosphoric acid and ammonia feeds were then started to the reactor. The feed rate of the merchant grade phosphoric acid and anhydrous ammonia vapor were carefully controlled at a ratio of $NH_3:PO_4$ equal to 0.95. The reaction temperature and pressure resulting from the feed conditions described were in the range of 450 to 460 F., and 25 to 35 psig, respectively.

During this time the pH of the product was maintained between 5 and 6 by adding supplemental ammonia in the product tank. The product temperature was kept below 140 F. by water sprays on the outside of the tank.

Feeds to the pipe reactor were continued until the density of the product solution reached 1.45 gms/ml. When this density was reached the phosphoric acid and ammonia feed to the pipe were stopped and the pH of the product adjusted to 6.0. Water was also added to maintain a density of 1.45 gms/ml.

The liquid fertilizer produced in this example was a nominal 10-34-0 ammonium polyphosphate with 41.5% of the $P_2O_5$ in a non-ortho or condensed form. Analysis of the material showed 95% of the polyphosphate to be pyrophosphate. The analysis of the product is shown in Table 3.

TABLE 3

| Sample I.D. | Liquid Fertilizer |
|---|---|
| Analysis, wt % | |
| Total $P_2O_5$ | 33.5 |
| Ortho $P_2O_5$ | 19.6 |
| N | 9.82 |
| MgO | 0.10 |
| $Na_2O$ | 0.027 |
| $K_2O$ | 0.007 |
| CaO | 0.02 |
| $Fe_2O_3$ | 1.47 |
| $Al_2O_3$ | 1.11 |
| $SiO_2$ | 1.78 |

Storage tests at various temperatures were then carried out on the liquid fertilizer produced. Samples were stored at 32, 120 and ambient (20 to 100 F.) temperatures to determine the sludge forming properties of the samples. In these tests the liquid fertilizers were inspected on a weekly basis for sludge formation. When 5% sludge by volume had formed in the sample observation was terminated. The sample kept at 32 F. remained free of solids for the duration of the test period (6 months) as did the sample which was subjected to ambient temperatures. These samples were occasionally inspected after the completion of the test and had remained free of solids in excess of 18 months. The sample kept at 120 F. remained free of solid material for 6 months when an equipment failure resulted in temperatures as high as 180 F. Analysis of the sample showed the non-ortho phosphate in this sample had been reduced to 22.5% of the total. This was caused by hydrolysis of the condensed phosphates at these elevated temperatures.

EXAMPLE 2

A wet-process phosphoric acid from a second source was treated as described in Example 1. The untreated, treated, and concentrated acid compositions are shown in Tables 4 and 5.

TABLE 4

| Sample I.D. | Untreated Acid | Treated Acid |
|---|---|---|
| Analysis, wt % | | |
| Total $P_2O_5$ | 27.8 | 26.5 |
| $SO_4$ | 0.70 | 1.21 |
| MgO | 0.68 | 0.11 |
| $Na_2O$ | 0.104 | 0.021 |

TABLE 4-continued

| Sample I.D. | Untreated Acid | Treated Acid |
|---|---|---|
| K2O | 0.033 | 0.007 |
| CaO | 0.12 | 0.004 |
| Fe2O3 | 0.33 | 0.34 |
| Al2O3 | 0.51 | 0.43 |
| SiO2 | 0.29 | 0.22 |

TABLE 5

| Sample I.D. | Concentrated Acid |
|---|---|
| Analysis, wt % | |
| Total P2O5 | 62.0 |
| Ortho P2O5 | 59.5 |
| SO4 | 2.20 |
| MgO | 0.31 |
| Na2O | 0.07 |
| K2O | 0.009 |
| CaO | 0.03 |
| Fe2O3 | 0.79 |
| Al2O3 | 1.18 |
| SiO2 | 0.03 |

For this example the liquid fertilizer pilot plant was run so as to produce a 11-37-0 ammonium polyphosphate product. The plant operation was similar to the above example but feed to the pipe reactor was continued until the product density was that corresponding to an 11-37-0 fertilizer (1.45 g/ml in this case because of the lower impurities content of the feed acid). The pipe reactor temperature and pressure during operation were 490 F. and 27 psig, respectively. The analysis of the ammonium polyphosphate product is shown in Table 6.

TABLE 6

| Sample I.D. | Liquid Fertilizer |
|---|---|
| Analysis, wt % | |
| Total P2O5 | 37.2 |
| Ortho P2O5 | 16.8 |
| N | 10.6 |
| MgO | 0.16 |
| Na2O | 0.030 |
| K2O | 0.010 |
| CaO | 0.03 |
| Fe2O3 | 0.47 |
| Al2O3 | 0.60 |
| SiO2 | 0.22 |
| SO4 | 1.69 |

Storage tests were conducted on samples of the 11-37-0 liquid fertilizer as described above. After the 6 month test period solids had not formed in any of the samples. Periodic observation of the sample stored at ambient temperatures revealed no precipitation after 9 months.

We claim:

1. A stable ammonium polyphosphate liquid fertilizer prepared by reaction of ammonia with concentrated wet-process phosphoric acid having a P2O5 concentration of 54 to 62 weight percent with substantially all of the P2O5 therein being in ortho form, said wet-process phosphoric acid prior to concentration having been contacted with a cation exchange resin to remove magnesium and calcium without appreciable reduction of iron and aluminum, said concentrated acid still containing on a weight percent basis referenced to 60% P2O5:
(i) 1.0% or greater iron and aluminum calculated as Fe2O3 and Al2O3, (ii) less than 0.3% magnesium calculated as MgO, and (iii) less than 0.15% total of sodium, potassium and calcium calculated as Na2O, K2O, and CaO, said liquid fertilizer being further characterized by remaining substantially sludge-free when stored at 25° C. for 6 months without addition of any sequestering or suspending agent.

2. The liquid fertilizer of claim 1 in which from 35 to 65% of the phosphate therein is in polyphosphate form.

3. The liquid fertilizer of claim 1 in which said iron and aluminum are still present in the concentrated acid in amounts greater than 1.5% by weight referenced to 60% P2O5.

4. A stable ammonium polyphosphate liquid fertilizer prepared by reaction of ammonia with concentrated wet-process phosphoric acid having a P2O5 concentration of 54 to 62% weight percent with substantially all of the P2O5 therein being in ortho form, said wet-process phosphoric acid prior to concentration having been contacted with a cation exchange resin to remove magnesium and calcium without appreciable reduction of iron and aluminum, said concentrated acid containing iron, aluminum, magnesium, calcium, sodium, and potassium in the following amounts referenced to 60% P2O5:

| Calculated as | Weight % |
|---|---|
| Fe2O3 | 0.5 to 2.5 |
| Al2O3 | 1 to 2.5 |
| MgO | Below 0.3 |
| CaO | Below 0.04 |
| Na2O | Below 0.05 |
| K2O | Below 0.03 | said liquid fertilizer being further characterized by remaining sludge-free when stored at 25° C. for 6 months without addition of any sequestering or suspending agent.

5. The liquid fertilizer of claim 4 in which from 35 to 65% of the phosphate therein is in polyphosphate form.

6. The liquid fertilizer of claim 4 in which said concentrated acid contains from 56 to 62% P2O5.

7. The liquid fertilizer of claim 6 in which from 40 to 55% of the phosphate therein is in polyphosphate form.

8. The liquid fertilizer of claim 1 which contains on a weight basis substantially 10% N and 34% P2O5 to provide a 10-34-0 fertilizer.

9. The liquid fertilizer of claim 4 which contains on a weight basis substantially 10% N and 34% P2O5 to provide a 10-34-0 fertilizer.

10. The liquid fertilizer of claim 1 which contains on a weight percent basis substantially 11% N and 37% P2O5 to provide an 11-37-0 fertilizer.

11. The liquid fertilizer of claim 4 which contains on a weight percent basis substantially 11% N and 37% P2O5 to provide an 11-37-0 fertilizer.

12. A liquid fertilizer as defined in claim 1 which has not over 65% of the phosphate therein in polyphosphate form.

13. A liquid fertilizer as defined in claim 1 which has not over 55% of the phosphate therein in polyphosphate form.

* * * * *